(12) United States Patent
Zhao et al.

(10) Patent No.: US 12,397,355 B1
(45) Date of Patent: Aug. 26, 2025

(54) LIGHTWEIGHT VIBRATION DAMPING CUTTING TOOL BAR

(71) Applicant: Shandong University, Jinan (CN)

(72) Inventors: Jinfu Zhao, Jinan (CN); Zhanqiang Liu, Jinan (CN); Bing Wang, Jinan (CN); Tianxiang Han, Jinan (CN); Wenjing Song, Jinan (CN); Qinghua Song, Jinan (CN); Yukui Cai, Jinan (CN); Xiaoliang Liang, Jinan (CN); Xiaoping Ren, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/178,934

(22) Filed: Apr. 15, 2025

(30) Foreign Application Priority Data

Nov. 26, 2024 (CN) .......................... 202411697223.8

(51) Int. Cl.
*B23B 27/00* (2006.01)
*B23B 29/02* (2006.01)

(52) U.S. Cl.
CPC .......... *B23B 27/002* (2013.01); *B23B 29/022* (2013.01)

(58) Field of Classification Search
CPC ....... B23B 29/02; B23B 29/04; B23B 29/022; B23B 27/00; B23B 27/002; B23Q 11/0032; B23Q 11/0039
See application file for complete search history.

(56) References Cited

U.S. PATENT DOCUMENTS

| 3,393,334 A | * | 7/1968 | Sundstrom | ............ B23B 29/022 |
| | | | | 384/446 |
| 2018/0154453 A1 | * | 6/2018 | Eichelberger | ......... B23B 27/002 |
| 2023/0390828 A1 | | 12/2023 | Song et al. | |

FOREIGN PATENT DOCUMENTS

| CN | 103962883 A | * | 8/2014 | .......... B23B 27/002 |
| CN | 107989958 A | * | 5/2018 | ............ B23B 27/10 |
| CN | 108356301 A | | 8/2018 | |
| CN | 108386486 A | * | 8/2018 | .......... B23B 29/022 |
| CN | 106994519 B | | 1/2019 | |
| CN | 114643372 A | * | 6/2022 | |
| CN | 114932241 A | * | 8/2022 | |
| CN | 116551011 A | | 8/2023 | |
| CN | 116673509 A | * | 9/2023 | .......... B23B 29/022 |
| DE | 3818827 A1 | * | 12/1988 | |
| DE | 102004024170 B4 | * | 9/2010 | ............ B23C 5/003 |

(Continued)

*Primary Examiner* — Nicole N Ramos
(74) *Attorney, Agent, or Firm* — Bayramoglu Law Offices LLC

(57) ABSTRACT

A lightweight vibration damping cutting tool bar includes a tool body, on which a plurality of cavities are opened along the length direction, and the cutting tool body between adjacent cavities have a BCC lattice structure, the closed magnetic pole device includes a plurality of magnetic pole pieces located at the bottom and side walls of the cavity respectively; the pendulum damper is placed inside the closed magnetic pole device composed of a plurality of magnetic pole pieces, the outer surface of the pendulum damper is provided with a magnetic pole patch corresponding to each magnetic pole piece one by one, the magnetic pole patch is set relative to the side with the same polarity of each magnetic pole piece, so that the magnetic force of each magnetic pole piece and the magnetic force of the corresponding magnetic pole patch are repelled.

8 Claims, 13 Drawing Sheets

(56) References Cited

FOREIGN PATENT DOCUMENTS

| EP | 1693131 B1 * | 1/2014 | ............ B23B 27/002 |
| EP | 4541490 A1 * | 4/2025 | ............ B23B 29/022 |
| JP | H11207502 A | 8/1999 | |
| KR | 20180018666 A | 2/2018 | |
| WO | 2023074922 A1 | 5/2023 | |
| WO | WO-2023098929 A1 * | 6/2023 | |

* cited by examiner

LIGHTWEIGHT VIBRATION DAMPING CUTTING TOOL BAR

CROSS REFERENCE TO THE RELATED APPLICATIONS

This application is based upon and claims priority to Chinese Patent Application No. 202411697223.8, filed on Nov. 26, 2024, the entire contents of which are incorporated herein by reference.

TECHNICAL FIELD

The invention relates to the technical field of machine cutting tools, specifically, a lightweight vibration damping cutting tool bar.

BACKGROUND

In the fields of aerospace, automobile manufacturing, and other fields, the structure of parts is becoming more and more complex, and the requirements for the processing quality and machining accuracy of key parts are getting higher and higher, which makes the original processing technology and equipment challenging to meet the requirements. One of the important reasons is cutting vibration. When the cutting vibration appears in the process, the cutting tool will leave chatter marks on the surface of the workpiece, which seriously affects the processing quality of the workpiece. At the same time, the cutting tool-machine tool process system will bear the vibration load, and the cutting tool is easy to wear or chipping, and the machine tool is also damaged to a certain extent.

For this reason, there are also related technologies that can reduce the chatter of turning tools in the existing technology. For example, the invention CN106994519 B discloses a viscoelastic constrained damping structure damping cutting tool bar, which reduces the problem of turning tool chatter in the turning process, it mainly uses the damping adhesive layer formed by the damping adhesive on the matrix of the cutting tool bar to bond a layer of viscoelastic damping layer, and a layer of constrained layer is bonded on the viscoelastic damping layer to form a constrained damping structure. The vibration energy generated at the cutting tool head during the turning process is transmitted from the matrix to the constrained damping structure, the viscoelastic damping layer in the constrained damping structure converts the vibration energy into heat energy dissipation through shear energy dissipation to suppress the turning chatter. For example, the invention CN108356301 A discloses a scattering periodic structure damping vibration damping cutting tool bar, which also solves the problem of tool chatter in turning processing to a certain extent, it mainly adopts an integrated structure of the cutting tool body and the cutting tool head, the peripheral surface of cutting tool body is evenly distributed with a plurality of rows and lines of damping scatters; the cutting tool body and the damping scatter form a scattering periodic structure; during the turning process, the vibration energy generated at cutting tool head is transferred from the cutting tool body to the damping scatter, the damping scatter is used to suppress the elastic wave in the forbidden band range, so that the vibration energy is converted into heat energy dissipation to suppress the turning chatter.

However, in the above two vibration damping cutting tool bars in the existing technology, the energy generated by vibration is still retained in the cutting tool body, and is slowly dissipated through the cutting tool body itself. However, the vibration energy in turning processing is continuous, and the conventional tool body structure makes it difficult to cope with the vibration energy generated continuously, so it is prone to wear or chipping.

SUMMARY

The purpose of the invention is to overcome the problems in the existing technology, provide a lightweight vibration damping cutting tool bar, reduce the weight of the cutting tool bar while ensuring stiffness, weaken the influence of the cutting vibration caused by the long overhang of cutting tool bar, and rely on the structure of the closed magnetic pole and the pendulum vibration damper to realize the vibration transfer and dissipation, so as to avoid that the continuous vibration energy generated in the turning process is retained in cutting tool body, thereby reducing the problem of cutting tool bar wear or chipping.

The invention discloses a lightweight vibration damping cutting tool bar, including a cutting tool body, and a plurality of cavities are opened along a length direction, the cutting tool body between adjacent cavities has a body-centered cubic (BCC) lattice structure.

a closed magnetic pole device, including a plurality of magnetic pole pieces located at a bottom and a side wall of the cavity respectively;

a pendulum damper, the pendulum damper is placed inside the closed magnetic pole device composed of a plurality of magnetic pole pieces, an outer surface of the pendulum damper is provided with a magnetic pole patch corresponding to each magnetic pole piece one by one, and the magnetic pole patch is set relative to a side with a same polarity of each magnetic pole piece, so that a magnetic force of each magnetic pole piece and the magnetic force of the corresponding magnetic pole patch are repelled.

Preferably, the pendulum damper includes:

a limiting fixture, the limiting fixture is placed on a top of the cavity and fixedly connected with the cutting tool body;

a damper, the damper has a through hole running up and down in a middle, and a periphery and a bottom of the damper are provided with a notch, each magnetic pole patch is fixed in each notch of the damper;

a spring, the spring is placed in the through hole of the damper, and a lower end is fixed on an upper surface of the magnetic pole patch at the bottom of the damper, and an upper end is fixed on a lower surface of the limiting fixture.

Preferably, the limiting fixture includes a limiting cover body and a leg connected to the limiting cover body, ends of each magnetic pole piece on the side wall of the cavity form a longitudinal narrow channel with an inner wall of the cavity, each leg of the limiting fixture is placed in the longitudinal narrow channel, an upper surface of the limiting cover body is flush with an upper surface of the cutting tool body and is fixedly connected to the cutting tool body.

Preferably, the cavity is cuboid, and a plurality of magnetic pole pieces include rectangular magnetic pole pieces and square magnetic pole pieces, and the square magnetic pole pieces are fixed at a bottom of the cavity; the rectangular magnetic pole pieces are all fixed around the cavity, and S poles of each rectangular magnetic pole piece and each square magnetic pole piece are all faced a center of the cavity.

Preferably, the four corners of the cavity and the rectangular magnetic poles on the two adjacent side walls at each corner form four longitudinal narrow channels together, and the legs are four, which are placed in the four longitudinal narrow channels one by one.

Preferably, the cutting tool body includes a cutting tool body frame, a wall thickness of the cutting tool body frame is 1.5 mm-3 mm, the wall thickness of each cavity is 1 mm-2 mm, and a thickness of the bottom of the cavity is 3 mm-5 mm, a space between the cutting tool body frame and each cavity is a BCC lattice structure.

Preferably, a plurality of cavities are evenly arranged.

Preferably, a processing method of the cutting tool body is 3D printing.

Preferably, a cemented carbide blade is arranged at a top of the cutting tool body.

Compared with the existing technology, the beneficial effect of the invention is as follows:

In this invention, the internal BCC lattice structure of the cutting tool body is designed to reduce the weight of the cutting tool bar by 61.7%, in a long overhang state, the internal BCC topology has lighter weight and good energy absorption capacity, thereby weakening the chatter during cutting.

In this invention, a pendulum damper and a closed magnetic pole device are designed. In the cutting process, the vibration energy generated by the cutting tool bar is first consumed by the BCC lattice structure, secondly, the residual vibration energy of the cutting tool body with the BCC lattice structure is transferred by the same pole magnetic repulsion principle of the pendulum damper and the closed magnetic pole device, the residual energy in cutting tool body with the BCC lattice structure is transferred to the pendulum damper, and the residual vibration energy is dissipated by the swing of the pendulum damper.

Under the support of the damping performance of the BCC lattice structure, the closed magnetic pole device, and the pendulum damper, the vibration energy of the cutting tool body of the invention dissipates the vibration energy continuously generated in the turning process through the way of consumption-transfer-reconsumption, thereby reducing the problem of cutting tool bar wear or chipping.

Figure 1:
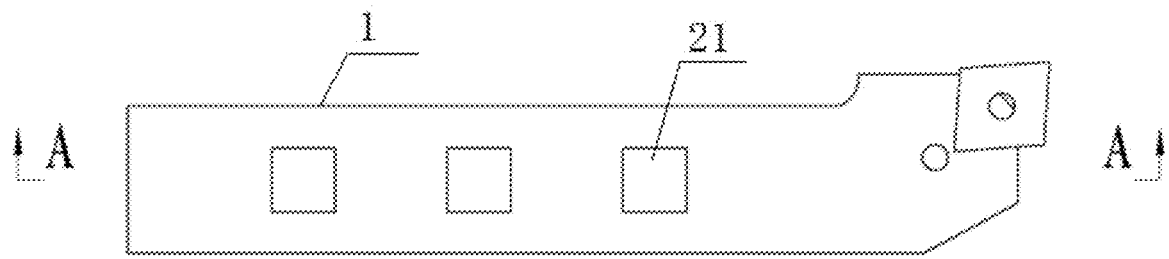
FIG. 1 is a schematic diagram of the overall structure of the embodiment of the invention.
Figure 2:
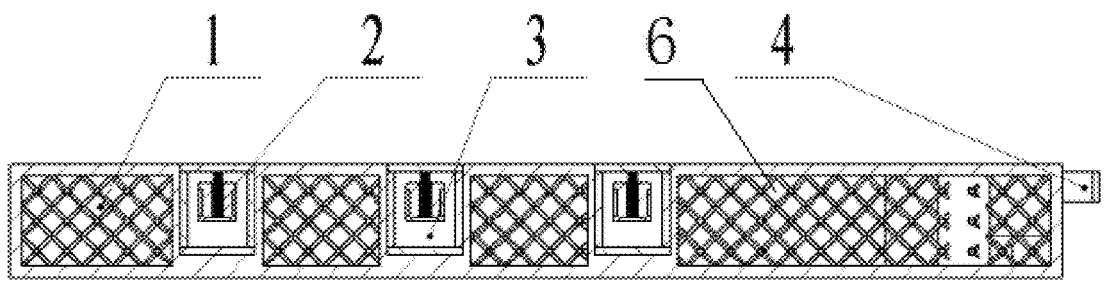
FIG. 2 is a schematic diagram of the internal structure at A-A of the cutting tool body of the embodiment of the invention.
Figure 3:
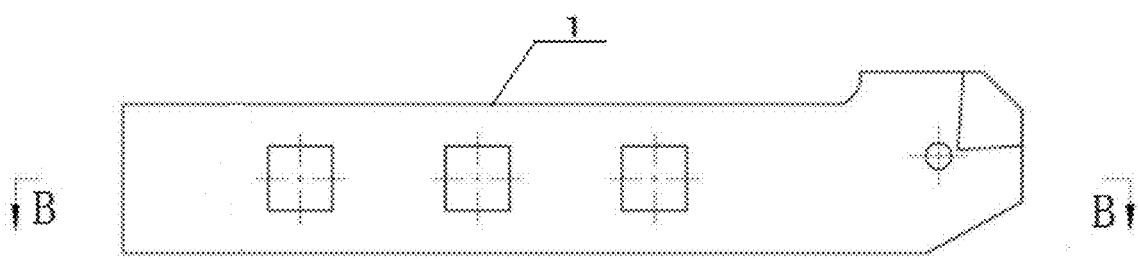
FIG. 3 is a schematic diagram of the cutting tool body structure of the embodiment of the invention.
Figure 4:
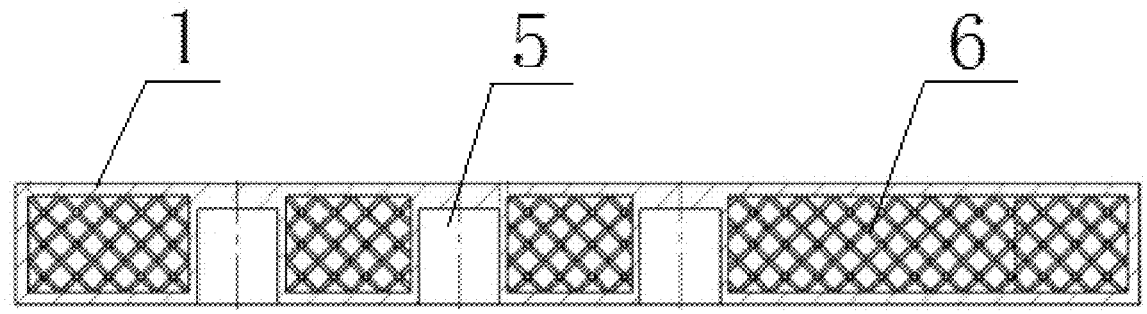
FIG. 4 is a structural schematic diagram of the cutting tool body at B-B of the embodiment of the invention.
Figure 5:
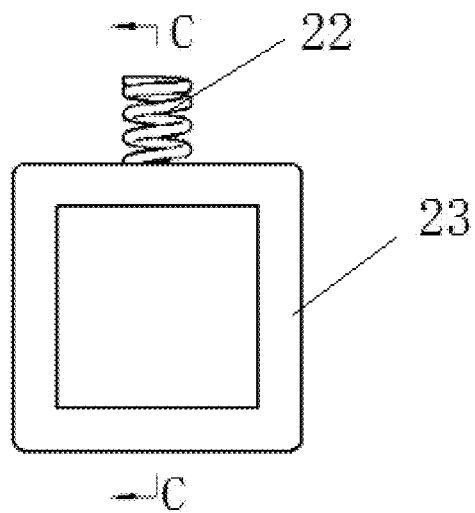
FIG. 5 is a front view of the pendulum damper of the embodiment of the invention.
Figure 6:
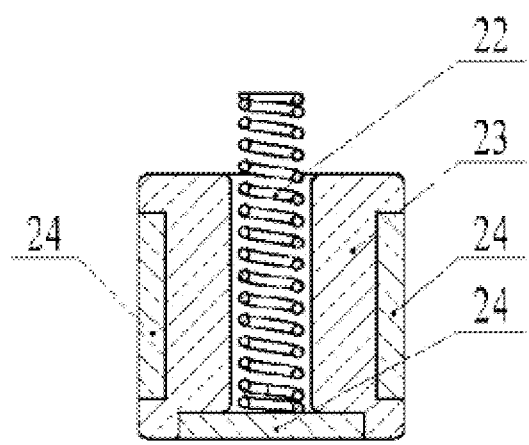
FIG. 6 is a structural schematic diagram of the pendulum damper at C-C of the embodiment of the invention.
Figure 7:
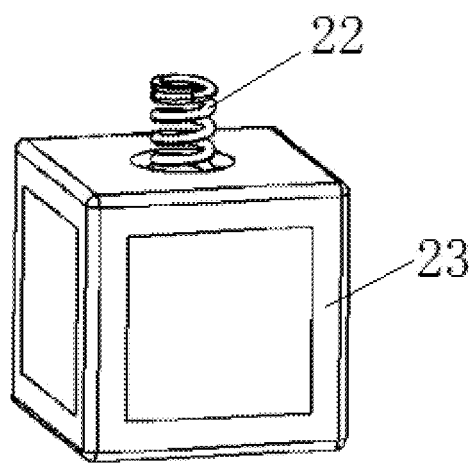
FIG. 7 is an overall structure diagram of the pendulum damper of the embodiment of the invention.

GRAPHICAL MARKUP DESCRIPTION 1, cutting tool body, 2, pendulum damper, 21, limiting fixture, 22, spring, 23, damper, 24, magnetic pole patch, 3, closed magnetic pole device, 31, rectangular magnetic pole piece, 32, square magnetic pole piece, 4, cemented carbide blade, 5, cavity, 6, BCC crystal structure.

DETAILED DESCRIPTION OF THE EMBODIMENTS

In order to make the purpose, technical scheme, and advantages of this embodiment of this disclosure clearer, the following will be combined with the drawings of this embodiment of this disclosure, and the technical scheme of this embodiment of this disclosure will be clearly and completely described. Obviously, the described embodiments are part of the embodiments of this disclosure, not all of the embodiments. Based on the embodiments described in this disclosure, all other embodiments obtained by ordinary technicians in this field without the need for creative labor belong to the scope of this disclosure protection.

Unless otherwise defined, the technical or scientific terms used here shall be the ordinary meaning understood by persons with general skills in the field to which the disclosure relates. 'first', 'second', and similar words used in this application do not indicate any order, quantity or importance, but are only used to distinguish different components. Similar words such as 'including' or 'included' mean that the components or objects in front of 'including' or 'included' now cover the components or objects listed after 'including' or 'included' and their equivalents, and do not exclude other components or objects. Similar words such as 'connecting' or 'connected' are not limited to physical or mechanical connections, but can include electrical connections, whether direct or indirect. 'Up', 'down', 'left', 'right', etc. are only used to represent the relative positional relationship. When the absolute position of the described object changes, the relative positional relationship may also change accordingly.

A lightweight vibration damping cutting tool bar provided by this embodiment included a cutting tool body 1 and a cemented carbide blade 4 fixed at the end of cutting tool body 1, the cutting tool body 1 provided by this embodiment was provided with a plurality of cavities 5 along the length direction, the cutting tool body 1 between adjacent cavities 5 had a BCC lattice structure, each cavity 5 was built with a closed magnetic pole device 3 and a pendulum damper 2, the closed magnetic pole devices 3 were located at a plurality of magnetic pole pieces on the bottom and side wall of the cavity 5. The S poles of each magnetic pole piece were oriented towards the center of the cavity 5 or the N poles were oriented towards the center of the cavity 5; the pendulum damper 2 was placed inside the closed magnetic pole device 3 composed of a plurality of magnetic pole pieces, the outer surface of the pendulum damper 2 was respectively provided with a magnetic pole patch 24 corresponding to each magnetic pole piece one by one, the side of the magnetic pole patch 24 and the same polarity of each magnetic pole piece faced each magnetic pole piece, so that the magnetic force of each magnetic pole piece and the magnetic force of the corresponding magnetic pole patch were repelled, Specifically, when the S-pole of each magnetic pole piece faced the center of the cavity 5, the S-pole of each magnetic pole patch 24 faced each magnetic pole piece; similarly, when the N poles of each magnetic pole piece faced the center of the cavity 5, the N poles of each magnetic pole patch 24 faced each magnetic pole piece, as long as the relative design of the two magnetic pole patch 24 and the magnetic pole piece met the same pole repulsion.

As a preferred embodiment, the pendulum damper 2 of this embodiment included a limiting fixture 21, a spring 22, and a damper 23. The limiting fixture 21 was placed at the upper opening at the top of the cavity 5 and is fixedly connected with the cutting tool body 1, the limiting fixture 21 was mainly used to limit the damper 23 to swing out from the cavity 5, and was also used to compensate for the stiffness loss caused by the opening of the cavity. In this embodiment, a through hole was opened in the middle of the damper 23, and a notch was arranged on the periphery and the bottom of the damper 23, each magnetic pole patch 24 was fixedly connected to each notch of the damper 23; the spring 22 was placed in the through hole of the damper 23, and its lower end was fixed on the upper surface of the magnetic pole patch 24 at the bottom of the damper 23, and the upper end was fixed on the lower surface of the limiting fixture 21. In this embodiment, the amplitude of the above pendulum damper 2 was related to the stiffness coefficient of the spring 22 and the damping coefficient of the damper 23, the vibration reduction performance could be optimized by adjusting the stiffness coefficient of spring 22 and the damping coefficient of damper 23 designed in this embodiment.

As another preferred embodiment, the limiting fixture 21 included a limit cover and legs connected to the limit cover, the end of each magnetic pole piece on the side wall of the cavity 5 forms a longitudinal narrow channel with the inner wall of the cavity 5, each leg of the limiting fixture 21 was arranged in the longitudinal narrow channel, the upper surface of the limit cover was flush with the upper surface of the cutting tool body 1, and was fixedly connected with the cutting tool body 1 to realize the stable installation of the limiting fixture 21.

The cavity 5 in this embodiment is a rectangular cavity, and a plurality of magnetic pole pieces included the rectangular magnetic pole pieces 31 and the square magnetic pole pieces 32. The square magnetic pole pieces 32 were fixed to the bottom end of the cavity 5; the rectangular magnetic pole pieces 31 were fixed around the cavity 5, and the sides of the rectangular magnetic pole piece 31 and the square magnetic pole piece 32 with the same polarity of each magnetic pole piece faced the center of the cavity 5. the rectangular pole piece 31 and the square pole piece 32 were easier to operate, and each side was symmetrical, which can better realize the energy transfer and consumption of the relative two sides to cope with the vibration energy from different directions.

In this embodiment, the four corners of the cavity 5 and the rectangular magnetic pole pieces 31 on the adjacent two side walls at each corner together formed four longitudinal narrow channels with a length and width of 1 mm, four legs were provided, which were placed in the four longitudinal narrow channels one by one. The four legs were matched with four longitudinal narrow channels to uniformly support the limit cover at four positions, providing a more stable support force for the limit cover.

In this embodiment, the cutting tool body 1 included a cutting tool body frame. The wall thickness of the cutting tool body frame was 1.5 mm-3 mm, the wall thickness of each cavity 5 was 1 mm-2 mm, and the bottom thickness of the cavity 5 was 3 mm-5 mm, the space between the cutting tool body frame and each cavity 5 was a BCC lattice structure. The above size design of this embodiment could provide sufficient rigid support for the BCC crystal structure 6 through the solid frame structure, and ensure the stiffness of the whole cutting tool body 1 at the same time, the cutting tool body 1 of this embodiment took into account the performance of lightweight, energy consumption and stiffness, which could better meet the needs of use and achieve the purpose of reducing chatter.

As a preferred embodiment, a plurality of cavities 5 were evenly arranged to form a uniform damping energy dissipation structure on the whole cutting tool body 1, so as to avoid the problem of vibration energy accumulation in the local part of the cutting tool body 1.

As another preferred embodiment, the processing method of the cutting tool body 1 was 3D printing, and the material of the BCC lattice structure was 316 stainless steel material or other metal powder for 3D printing.

As another preferred embodiment, the top of the cutting tool body 1 was equipped with a cemented carbide blade 4, and the cutting tool body 1 and the cemented carbide blade 4 adopted the conventional installation method in the existing technology.

As shown in FIGS. 1-4, this embodiment provides a lightweight vibration damping cutting tool bar, including a cutting tool body 1 (i.e., cutting tool bar body), the pendulum damper 2, the closed magnetic pole device 3, and the cemented carbide blade 4, the internal topological structure of the cutting tool body 1 was a BCC lattice structure, as shown in FIGS. 1-4, three internal cavities were evenly opened inside the cutting tool body 1; the closed magnetic pole device 3 was welded in the cavity 5 of BCC cutting tool body 1; the pendulum damper 2 was placed inside the closed magnetic pole device 3; the cemented carbide blade 4 was installed at the top of the cutting tool body 1.

Figure 27:
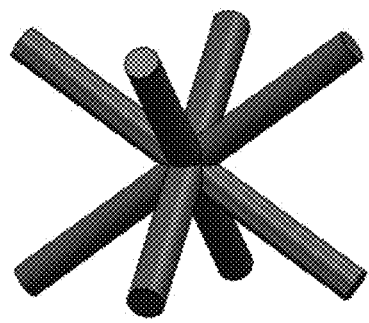
FIG. 27 is a schematic diagram of the BCC lattice structure of the embodiment of the invention.
Figure 28:
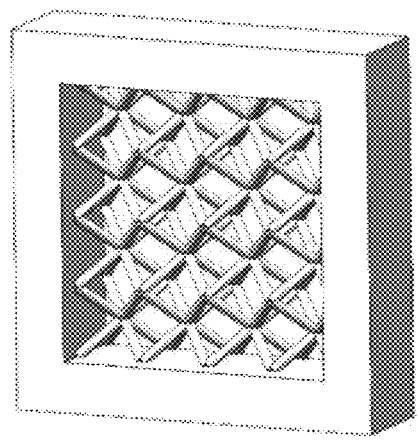
FIG. 28 is a schematic diagram of the local lattice structure arrangement of the embodiment of the invention.

As an example, the wall thickness of the cutting tool body 1 was 1.5 mm, the wall thickness of the cavity 5 was 1 mm, the bottom thickness of the cavity 5 was 3 mm, and the interval of the three cavities 5 was 27.5 mm, other spaces were all BCC lattice structures, the specific structure of the BCC lattice structure was shown in FIGS. 27-28, which can achieve the best seismic effect while satisfying the stiffness. The material of cutting tool body 1 was 316L stainless steel, and the processing method was 3D printing, the particle size of the powder was 15 μm-53 μm, and the printing parameters were set as follows: the thickness of the powder was 30 μm, the laser power was 350 W, the scanning interval was 80 μm, and the scanning waiting time was 15 s, this printing parameter was suitable for the WXL-120E printer, which ensured the maximum density inside the cutting tool body 1.

where the closed magnetic pole device 3 included a rectangular magnetic pole piece 31 and a square magnetic pole piece 32. The square magnetic pole piece 32 was fixedly connected to the bottom end of the cavity 5 of the cutting tool body 1; the rectangular magnetic pole piece 31 was uniformly fixed around the cavity 5, and the S-pole of each magnetic pole piece faced inward, the four rectangular magnetic pole pieces 31 and the cavity 5 formed a narrow channel with a length and width of 1 mm.

As shown in FIGS. 5-8, the pendulum damper 2 included a limiting fixture 21, a spring 22, a damper 23, and a magnetic pole patch 24. FIGS. 9-12 showed the specific structure of the damper 23. It can be seen from the figures that the damper 23 had a through hole in the middle, and the damper 23 had a notch in five directions: the front end, the back end, the left end, the right end, and the lower end, the magnetic pole patch 24 was fixedly connected to the five notches of the front end, the back end, the left end, the right end and the lower end of the damper 23, and S-pole of the magnetic pole patch 24 in five directions faced outward. The spring 22 was a miniature spring, which was placed in the through hole of the damper 23, the lower end was welded on the upper surface of the magnetic pole patch 24, and the upper end was welded on the lower surface of the limiting fixture 21, the limiting fixture 21 was provided with four legs, which were respectively arranged in the longitudinal narrow channel formed by the four corners of the closed magnetic pole device 3 and the cavity 5, and the upper surface of the limiting fixture 21 was flush with the upper surface of the cutting tool body 1, and was welded on the upper surface of the cutting tool body 1.

In this embodiment, the internal structure of cutting tool body 1 was designed as a BCC lattice structure, which could reduce the weight of the cutting tool bar by 61.7%. In the long overhang state, the internal BCC topology had lighter weight and good energy absorption capacity, thus weakening the influence of chatter on the machining quality during cutting.

The pendulum damper 2 and the closed magnetic pole device 3 were also designed in this embodiment, during the cutting process, the vibration energy generated by the cutting tool bar was first consumed by the BCC lattice structure, secondly, the residual vibration energy of the cutting tool body 1 was transferred through the magnetic repulsion principle of the S pole of the pendulum damper 2 and the closed magnetic pole device 3, the residual energy of the cutting tool body 1 was transferred to the pendulum damper 2, and the residual vibration energy was dissipated by the swing of the pendulum damper 2, under the support of the BCC lattice structure, the damping performance of the closed magnetic pole device 3 and the pendulum damper 2, the vibration energy was dissipated through the process of consumption-transfer-reconsumption to avoid the cutting tool wear and chipping. At the same time, due to the maximum suppression of chatter in this embodiment, the machining stability was also improved.

Figure 13:
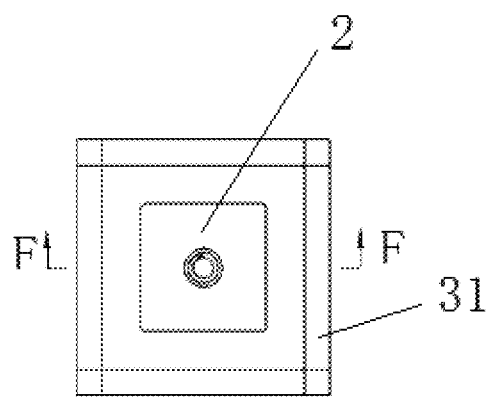
FIG. 13 is a structural schematic diagram of the built-in pendulum damper of the closed magnetic pole device of the invention.
Figure 14:
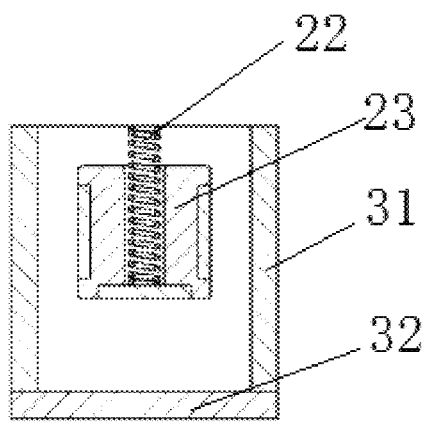
FIG. 14 is a structural diagram at F-F in FIG. 13 of the invention.
Figure 15:
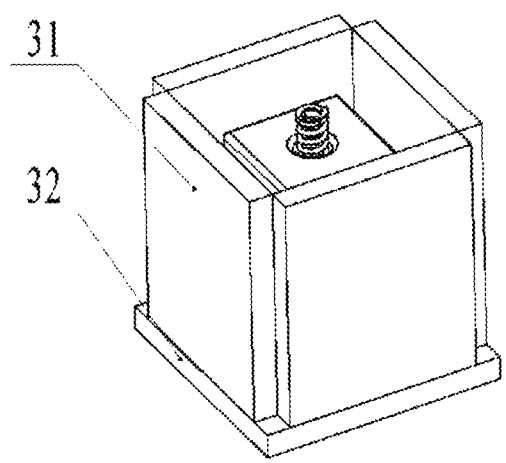
FIG. 15 is a three-dimensional structural diagram of the built-in pendulum damper of the closed magnetic pole device of the invention.
Figure 16:
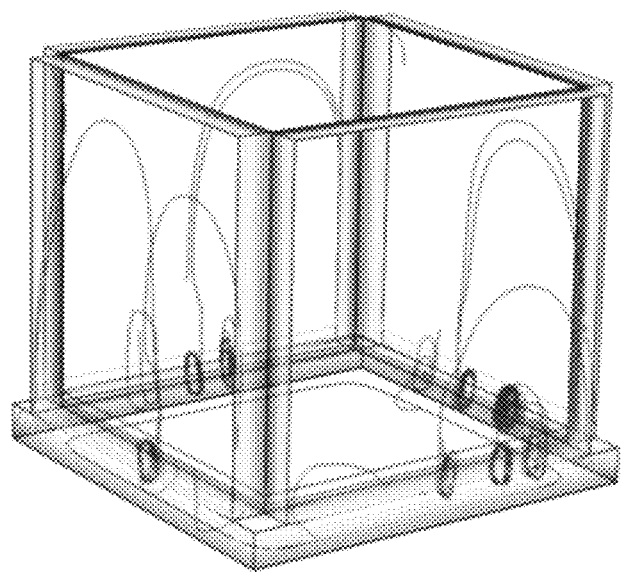
FIG. 16 is a schematic diagram of the magnetic field strength in the closed magnetic pole of the embodiment of the invention.

FIGS. 13-15 of this embodiment illustrated the assembly method of the closed magnetic pole device 3 and the pendulum damper 2;

FIG. 16 of this embodiment was a schematic diagram of the magnetic field strength in the closed magnetic pole device of this embodiment;

in order to further explain the vibration damping performance of the invention, the following was described in detail in combination with the simulation test drawings.

Figure 17:
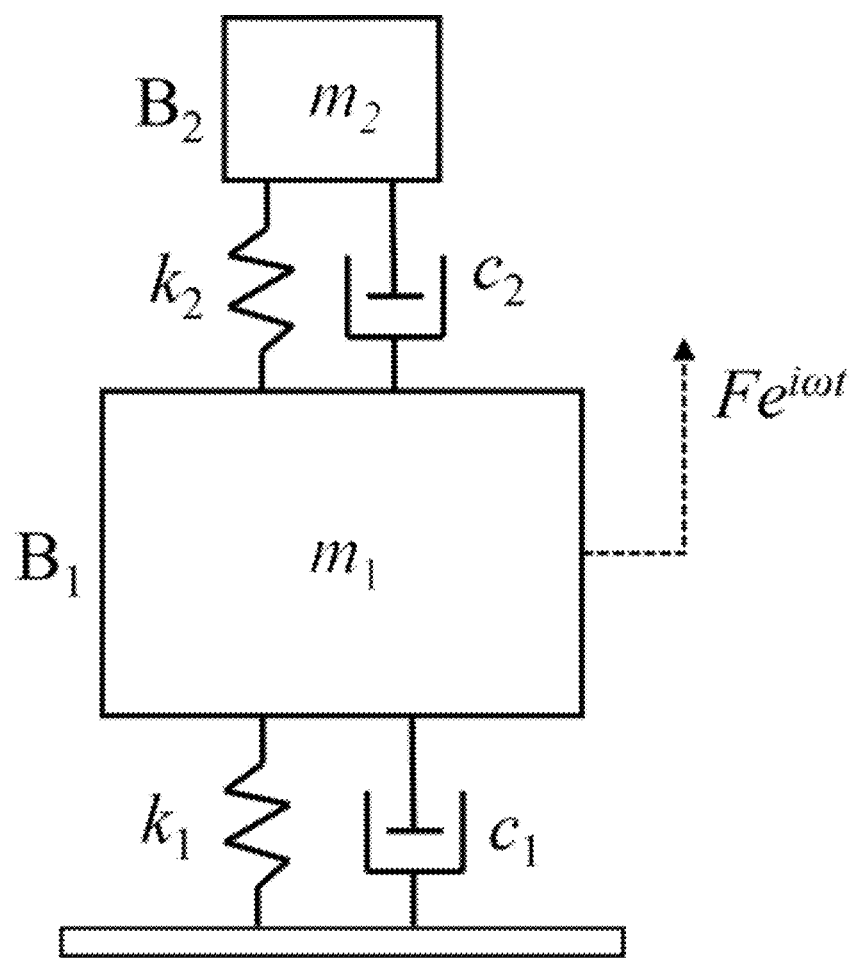
FIG. 17 is a schematic diagram of the two-degree-of-freedom system of the embodiment of the invention.

As shown in FIG. 17, the cutting tool body with BCC crystal structure 6 (BCC cutting tool body for short) was B1, and the cutting tool body with the pendulum damper 2 was B2, the mass of B1 was $m_1$, which was supported by the stiffness coefficient $k_1$ and the damping coefficient $c_1$, and the mass of B2 was $m_2$, the spring 22 with the stiffness coefficient $k_2$ and the damper 23 with the damping coefficient $c_2$ were connected with B1, and B1 was excited by the harmonic force $Fe^{i\omega t}$. As shown in FIG. 17, the dynamic equation of this system was as follows:

$$M\ddot{x}+C\dot{x}+Kx=Fe^{i\omega t};$$

where M was the mass matrix, C was the damping matrix, K was the stiffness matrix, and F was the force matrix; e was the symbol of simple harmonic force, ω was the frequency, i was the imaginary number, and t is time;

each matrix is defined as:

$$M = \begin{pmatrix} m_1 & 0 \\ 0 & m_2 \end{pmatrix}, K = \begin{pmatrix} k_1+k_2 & -k_2 \\ -k_2 & k_2 \end{pmatrix}$$

$$C = \begin{pmatrix} c_1+c_2 & -c_2 \\ -c_2 & c_2 \end{pmatrix}, x = \begin{pmatrix} x_1 \\ x_2 \end{pmatrix}, F = \begin{pmatrix} F_0 \\ 0 \end{pmatrix}$$

Where $x_1$, $x_2$ were the vertical displacements of the relative equilibrium position of B1 and B2, respectively, $F_0$ was the amplitude value of the excitation force, assuming:

$$x=Ae^{i\omega t}, A=(A_1 A_2)^T.$$

where A was the amplitude matrix, $A_1$ was the amplitude of B1, $A_2$ was the amplitude of B2;

substituting into the equation:

$$(K-\omega^2 M+i\omega C)A=F$$

the solution is:

$$A=HF;$$

where $H=(K-\omega^2 M+i\omega C)^{-1}$ was the complex frequency response matrix;

$$H = \frac{1}{\Delta(\omega)} \begin{pmatrix} k_2-m_2\omega^2+i\omega c_2 & k_2+i\omega c_2 \\ k_2+i\omega c_2 & k_1+k_2-m_2\omega^2+i\omega(c_2-c_1) \end{pmatrix};$$

-continued
$$\Delta(\omega) = |K - \omega^2 M + i\omega C|$$
$$= |(k_1 - m_1\omega^2)(k_2 - m_2\omega^2) + (c_1c_2 - k_2m_2)\omega^2 ;$$
$$+ i\omega\{c_2[k_1 - (m_1 + m_2)\omega^2] - c_1(k_2 - m_2\omega^2)\}|$$

the amplitude of the forced vibration is as follows:

$$A_1 = \frac{F_0}{\Delta(\omega)}(k_2 - m_2\omega^2 + i\omega c_2), A_2 = -\frac{F_0}{\Delta(\omega)}(k_2 + i\omega c_2);$$

where $A_1$ was the amplitude of B1, $A_2$ was the amplitude of B2;
the amplitude $A_1$ of B1 was written as:

$$A_1 = \frac{F_0}{D(\omega)}[P(\omega) + iQ(\omega)];$$

where the functions of $P(\omega), Q(\omega), D(\omega)$ were defined as:

$$P(\omega)=[(k_1-m_1\omega^2)(k_2-m_2\omega^2)-k_2m_2\omega^2](k_2-m_2\omega^2)+ c_2{}^2\omega_2[k_1(m_1+m_2)\omega^2]$$

$$Q(\omega)=\omega[c_2\omega^2(c_1c_2-m_2{}^2\omega^2)-c_1(k_2-m_2\omega^2)]$$

$$D(\omega)=[(k_1-m_1\omega^2)(k_2-m_2\omega^2)+(c_1c_2-k_2m^2)\omega^2]^2-\omega^2\{c_2 [k_1-(m_1+m_2)\omega^2]-c_1(k_2-m_2\omega^2)\}^2;$$

in the case of no damping, in order to eliminate the vibration of BCC cutting tool body B1. $P(\omega)=0$, and the sufficient condition was as follows:

$$k_2-m_2\omega^2=0$$

$$k_1-(m_1+m_2)\omega^2=0;$$

that is, when $m_1 \gg m_2$, the natural frequency $\sqrt{k_2/m_2}$ of the cutting tool body B2 with pendulum damper 2 and the natural frequency $\sqrt{k_2/(m_1)}$ of the BCC tool body B1 was close to the excitation frequency, and the amplitude $A_1$ of B1 was almost zero. At this time, the BCC tool still had residual vibration, the forced vibration amplitudes of B1 and B2 were as follows:

$$A_1 = \frac{ic_2F_0}{(c_1c_2 - k_2m_2)\omega}, A_2 = \frac{F_0(k_2 + ic_2\omega)}{(c_1c_2 - k_2m_2)\omega^2};$$

if the smaller mass $m_2$, stiffness coefficient $k_2$ and stronger damping coefficient $c_2$ of the pendulum damper 2 were selected, and the damping of the BCC cutting tool body was assumed to be much larger than the damping of the pendulum damper 2, then $c_1c_2 \gg k_2m_2$. Then the approximate values of $A_1$ and $A_2$ modules were derived to be $$|A_1| = \frac{F_0}{c_1\omega}, |A_2| = \frac{F_0}{c_1\omega}\sqrt{1 + \left(\frac{k_0}{c_2\omega}\right)^2} ;$$

it could be seen that the amplitude of the BCC cutting tool body depends on the damping coefficient $c_1$, and the damping coefficient $c_1$ is related to the internal lattice structure of the cutting tool body, the amplitude of the pendulum damper 2 is related to the stiffness coefficient $k_2$ and the damping coefficient $c_2$, so the damping performance can be optimized by adjusting the stiffness coefficient and the damping coefficient.

The above description is the vibration damping principle of the invention.

Figure 8:
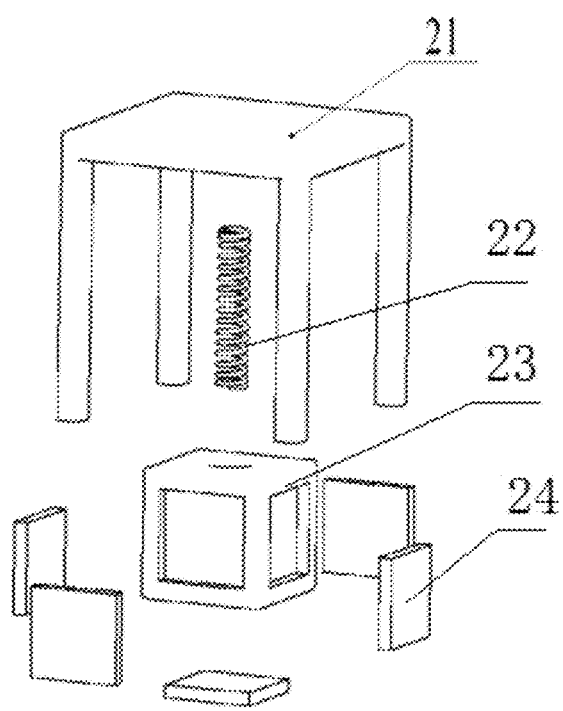
FIG. 8 is an explosion diagram of the pendulum damper structure of the embodiment of the invention.
Figure 9:
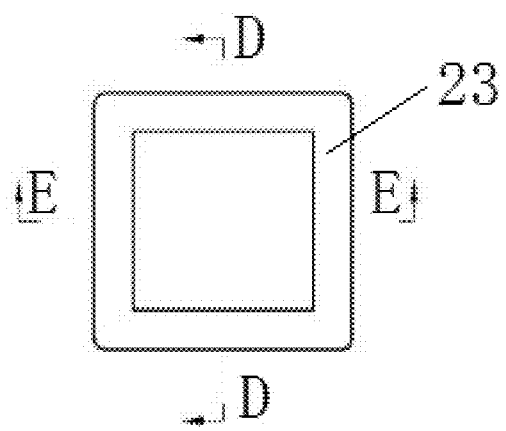
FIG. 9 is a two-dimensional schematic diagram of the damper structure of the embodiment of the invention.
Figure 10:
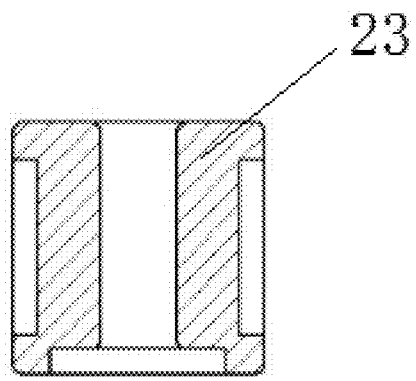
FIG. 10 is a section diagram of the two-dimensional structural schematic diagram of the damper at D-D in FIG. 9 of the invention.
Figure 11:
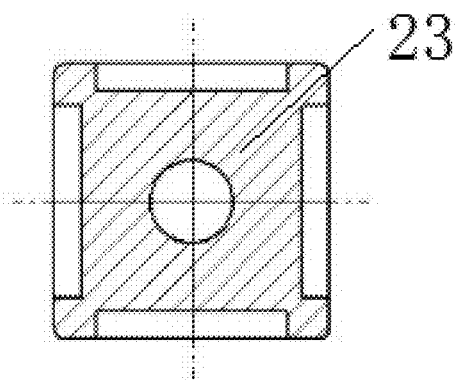
FIG. 11 is a section diagram of the two-dimensional structural schematic diagram of the damper at E-E in FIG. 9 of the invention.
Figure 12:
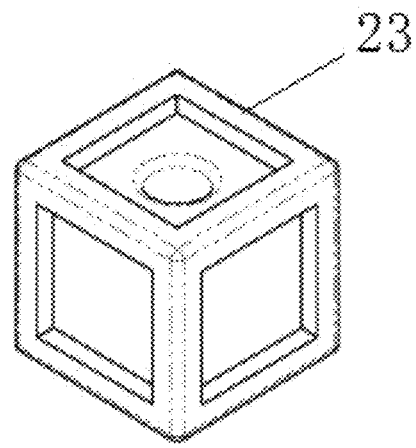
FIG. 12 is a structural schematic diagram of the damper of the embodiment of the invention.

As shown in FIGS. 18-21, the invention provided three models for ANSYS simulation, which were solid cutting tool body, BCC cutting tool body, and cutting tool body with pendulum damper 2, respectively. The three models were imported into ANSYS Workbench, and fixed support was applied to the left end of the cutting tool body. The modal analysis of the three tool bodies from 1 to 20 orders was carried out respectively, and the comparison results were obtained as shown in FIG. 8. The comparison results in the figure showed that the vibration frequency of the solid tool body was the highest, followed by the BCC tool body, and the vibration frequency of cutting tool body with the pendulum damper 2 was the lowest, indicating that the BCC lattice structure had a good absorption effect on the vibration energy.

Figure 18:
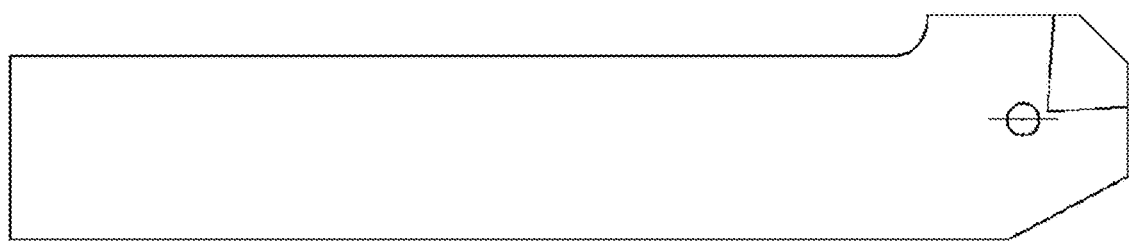
FIG. 18 is a structural diagram of the solid cutting tool body for the simulation test provided by the embodiment of the invention.
Figure 19:
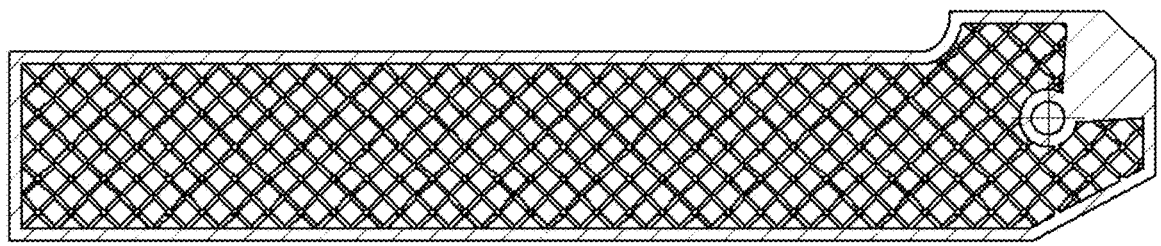
FIG. 19 is a structural diagram of the cutting tool body with the BCC structure for the simulation test provided by the embodiment of the invention.
Figure 20:
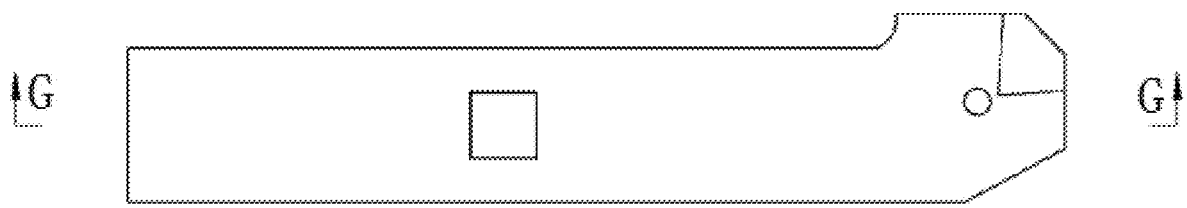
FIG. 20 is a structural diagram of the cutting tool body with the pendulum damper for the simulation test provided by the embodiment of the invention.
Figure 21:
FIG. 21 is a structural diagram at G-G in FIG. 20 of the invention.
Figure 22:
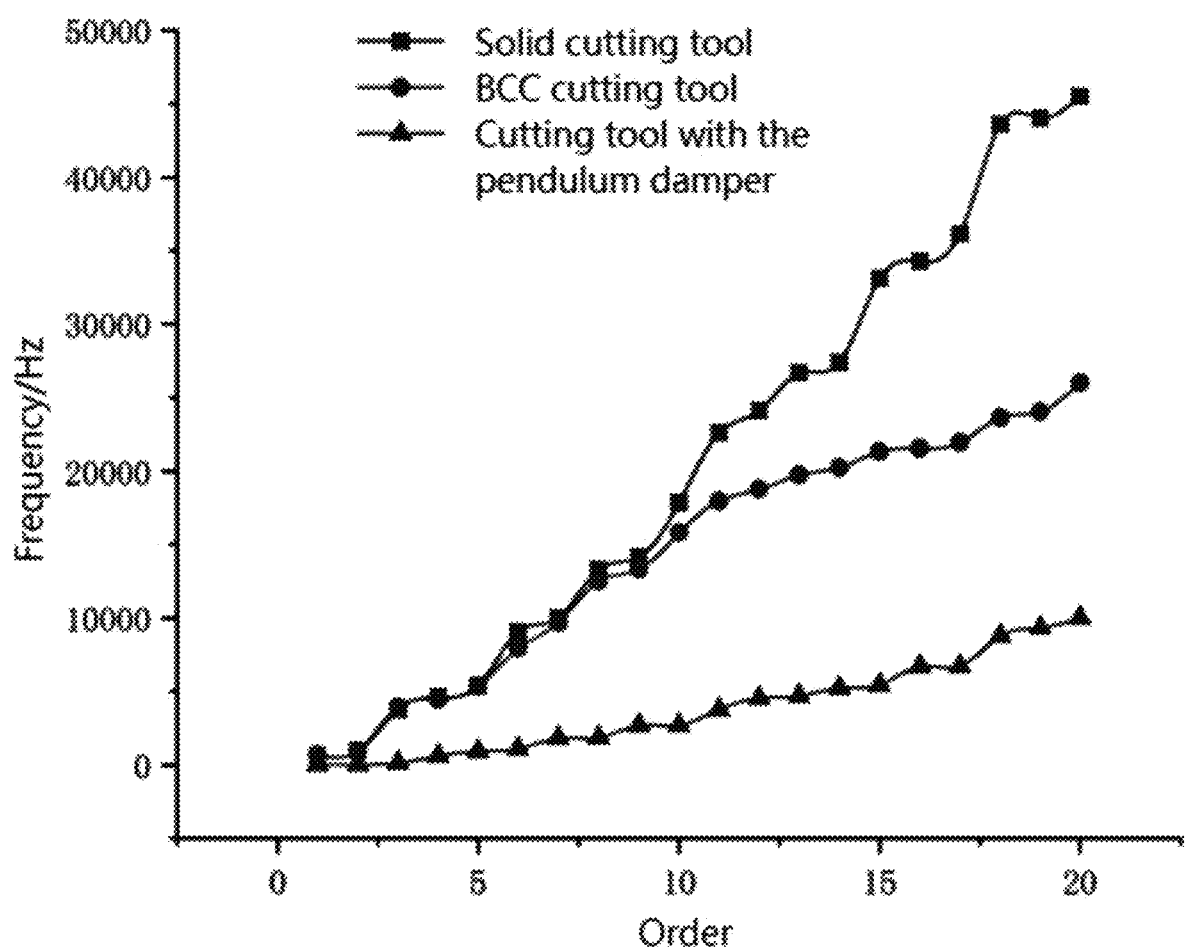
FIG. 22 is a comparison diagram of the modal analysis vibration frequency of the three cutting tool bodies in FIGS. 18-20.
Figure 23:
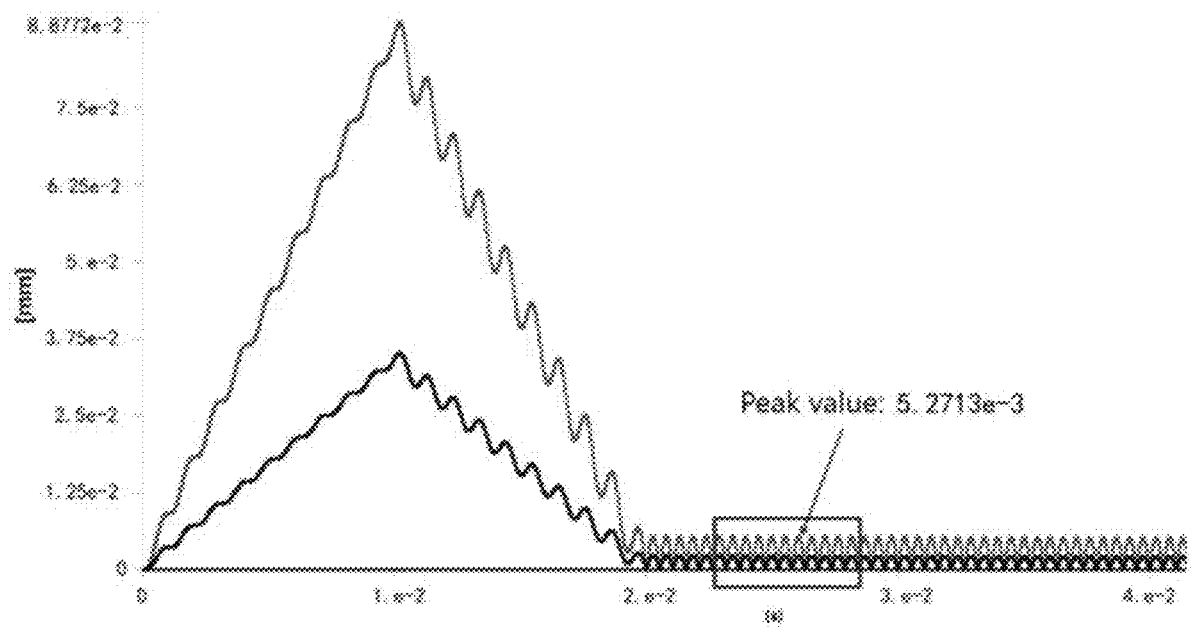
FIG. 23 is a transient excitation vibration deformation waveform of the solid tool body in FIG. 18.
Figure 24:
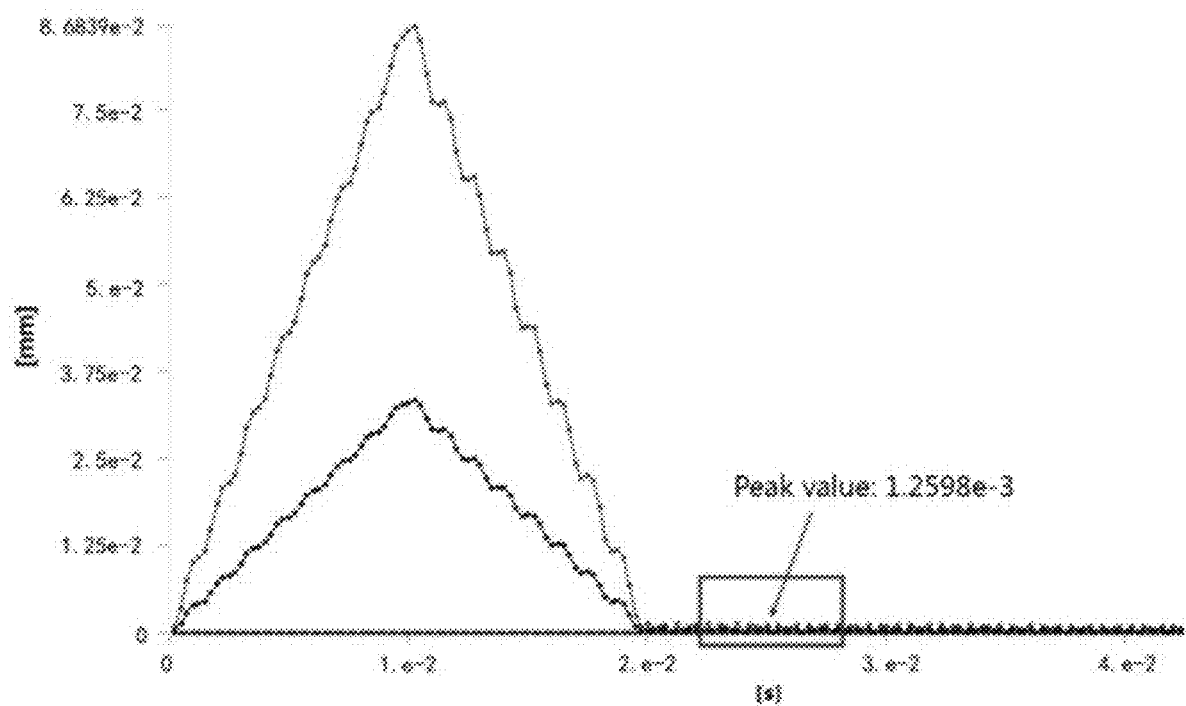
FIG. 24 is a transient excitation vibration deformation waveform of the cutting tool body with the pendulum damper in FIG. 20.
Figure 25:
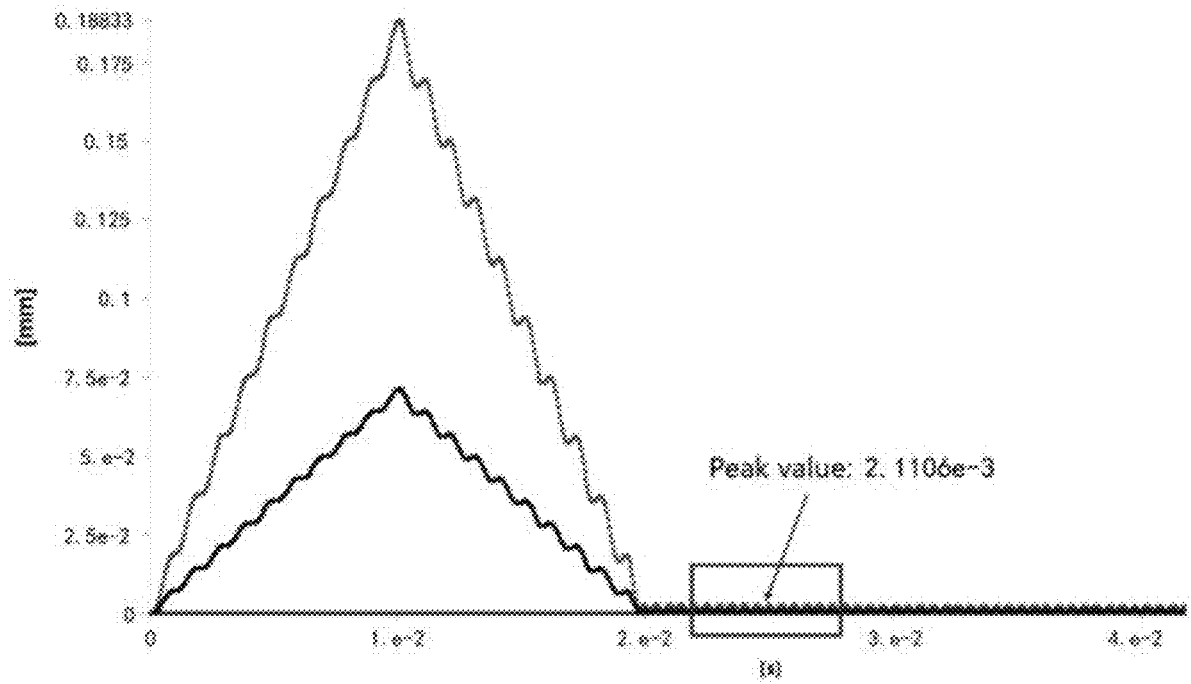
FIG. 25 is a transient excitation vibration deformation waveform of the cutting tool body with the BCC structure in FIG. 19.
Figure 26:
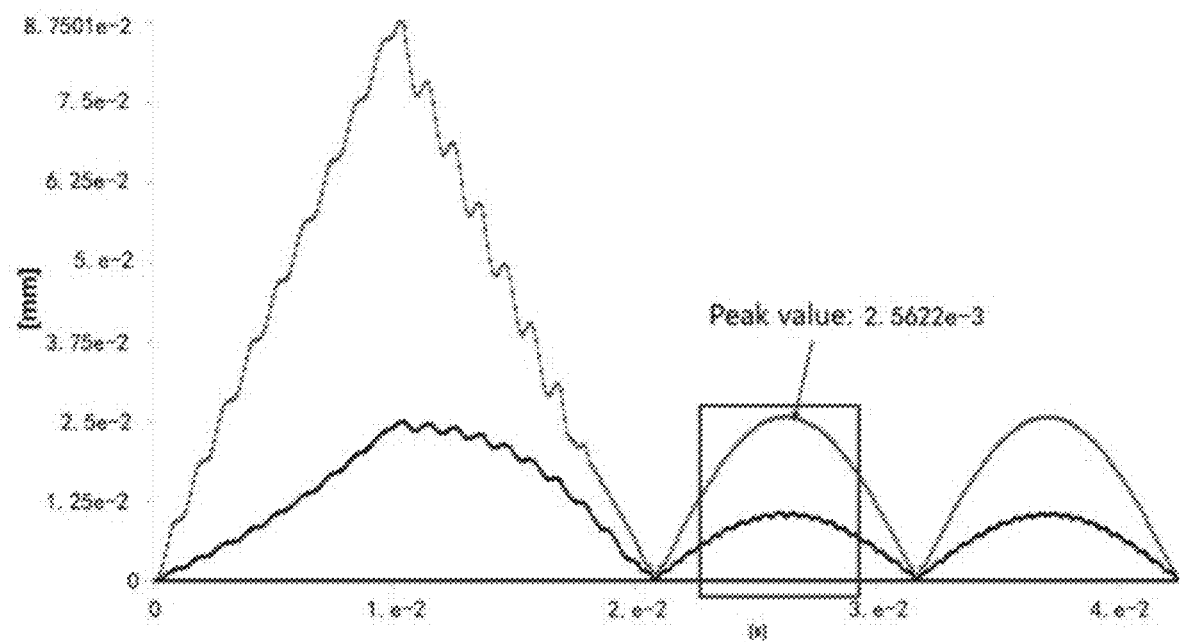
FIG. 26 is a vibration deformation waveform diagram of the pendulum damper of the embodiment of the invention.

FIG. 22 of this embodiment was a comparison of the modal analysis vibration frequencies of the three cutting tool bodies in FIGS. 18-20;

FIGS. 23-26 of this embodiment were the transient excitation vibration deformation waveforms of the three cutter bodies. Among the two curves of each attached figure, the curve at the top was the maximum value of the transient excitation vibration deformation waveform, and the curve at the bottom was the average value of the transient excitation vibration deformation waveform, the transient impact test simulation of the three cutting tool bodies was carried out, the transient impact force was increased from 0 s-0.01 s to 300 N, and then attenuated to 0 in 0.01 s-0.02 s, applied to the tip of the cutting tool body, and the anti-vibration performance of the three cutting tool bodies was observed. The results showed that the peak value of the vibration deformation wave of the solid cutting tool body after the transient impact was 5.2713e-3 mm, the peak value of the vibration deformation wave of the BCC tool body was 2.1106e-3 mm, the peak value of the vibration deformation wave of cutting tool body with the pendulum damper 2 was 1.2598e-3 mm, and the peak value of the vibration deformation wave of the pendulum damper 2 inside cutting tool body was 2.5622e-2 mm, indicating that the pendulum damper 2 successfully achieved vibration transfer.

The above simulation results show that the BCC lattice structure can not only reduce the weight, but also has a good absorption effect on the vibration energy. The design of the pendulum damper 2 successfully reduces the peak value 5.2713e-3 mm of the solid tool body to 1.2598e-3 mm, and realizes the transfer of the cutting tool body vibration. Under the support of the BCC lattice structure and the pendulum damper 2, the vibration energy is dissipated through the process of consumption-transfer-reconsumption. The suppression of chatter is maximized and the processing stability is improved.

Although the embodiment of the invention has been shown and described, it is understandable to ordinary technicians in the field that the embodiment can be varied, modified, replaced, and changed without departing from the principles and spirit of the invention, and the scope of the invention is limited by the accompanying claims and their equivalents.

What is claimed is:

1. A lightweight vibration damping cutting tool bar, comprising:

a cutting tool body (1), wherein a plurality of cavities (5) are opened along a length direction, and the cutting tool body (1) between adjacent cavities (5) has a body-centered cubic (BCC) lattice structure;

a closed magnetic pole device (3), comprising a plurality of magnetic pole pieces located at a bottom and a side wall of each of the plurality of cavities (5) respectively; and a pendulum damper (2), wherein the pendulum damper is placed inside the closed magnetic pole device (3) formed by the plurality of magnetic pole pieces, an outer surface of the pendulum damper (2) is provided with a magnetic pole patch (24) corresponding to each of the plurality of magnetic pole pieces one by one, and the magnetic pole patch (24) is set relative to a side with a same polarity of each of the plurality of magnetic pole pieces, so that a magnetic force of each of the plurality of magnetic pole pieces and a magnetic force of the corresponding magnetic pole patch (24) are repelled;

wherein the pendulum damper (2) comprises:

- a limiting fixture (21), wherein the limiting fixture is placed on a top of each of the plurality of cavities (5) and fixedly connected with the top of each of the plurality of cavities (5);
- a damper (23), wherein the damper has a through hole running up and down in a middle, each of a periphery and a bottom of the damper (23) is provided with a notch, and the magnetic pole patch (24) is fixed in the notch of the damper (23); and
- a spring (22), wherein the spring is placed in the through hole of the damper (23), a lower end of the spring is fixed on an upper surface of the magnetic pole patch (24) at the bottom of the damper (23), and an upper end of the spring is fixed on a lower surface of the limiting fixture (21); the limiting fixture (21) comprises a limiting cover body and a leg connected to the limiting cover body, ends of each of the plurality of magnetic pole pieces on the side wall of each of the plurality of cavities form a longitudinal narrow channel with an inner wall of each of the plurality of cavities, the leg of the limiting fixture (21) is placed in the longitudinal narrow channel, and an upper surface of the limiting cover body is flush with an upper surface of the cutting tool body (1) and is fixedly connected to the cutting tool body (1).

2. The lightweight vibration damping cutting tool bar according to claim 1, wherein each of the plurality of cavities (5) is cuboid, the plurality of magnetic pole pieces comprise rectangular magnetic pole pieces (31) and square magnetic pole pieces (32), and the square magnetic pole pieces (32) are fixed at the bottom of each of the plurality of cavities (5); and the rectangular magnetic pole pieces (31) are all fixed around each of the plurality of cavities (5), and S poles of each of the rectangular magnetic pole pieces (31) and each of the square magnetic pole pieces (32) are all faced a center of each of the plurality of cavities (5).

3. The lightweight vibration damping cutting tool bar according to claim 2, wherein four corners of each of the plurality of cavities (5) and the rectangular magnetic poles (31) on two adjacent side walls at each of the four corners form four longitudinal narrow channels together, and four legs are placed in the four longitudinal narrow channels one by one.

4. The lightweight vibration damping cutting tool bar according to claim 1, wherein the cutting tool body (1) comprises a cutting tool body frame, a wall thickness of the cutting tool body frame is 1.5 mm-3 mm, a wall thickness of each of the plurality of cavities (5) is 1 mm-2 mm, a thickness of the bottom of each of the plurality of cavities (5) is 3 mm-5 mm, and a space between the cutting tool body frame and each of the plurality of cavities (5) is the BCC lattice structure.

5. The lightweight vibration damping cutting tool bar according to claim 1 or 4, wherein the plurality of cavities (5) are evenly arranged.

6. The lightweight vibration damping cutting tool bar according to claim 1, wherein a processing method of the cutting tool body (1) is 3D printing.

7. The lightweight vibration damping cutting tool bar according to claim 1, wherein a cemented carbide blade (4) is arranged at a top of the cutting tool body (1).

8. The lightweight vibration damping cutting tool bar according to claim 4, wherein the plurality of cavities are evenly arranged.

* * * * *